No. 804,985. PATENTED NOV. 21, 1905.
E. H. SEARLE.
FIREARM.
APPLICATION FILED OCT. 1, 1904.
4 SHEETS—SHEET 1.
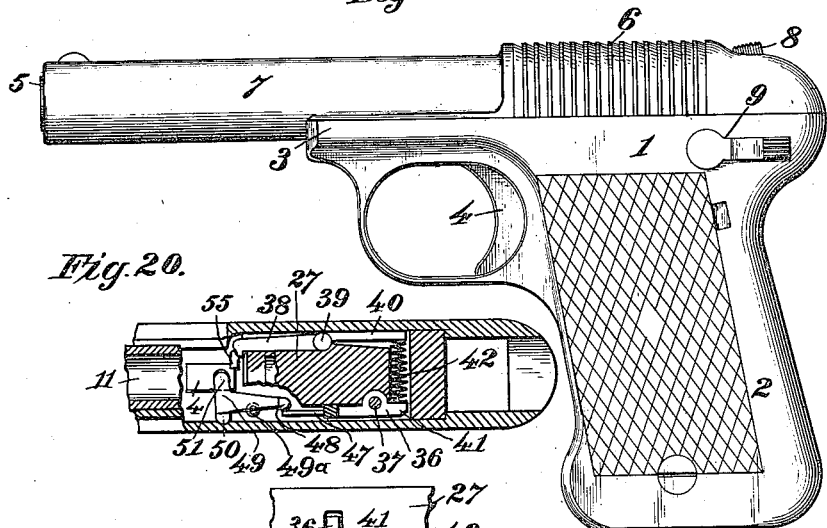
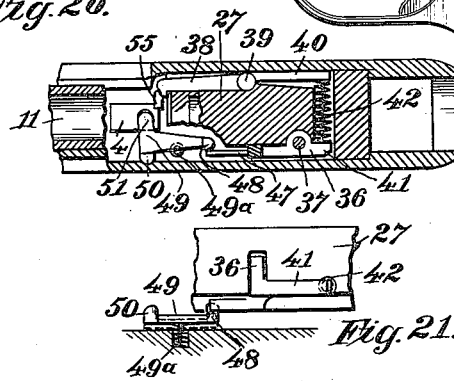
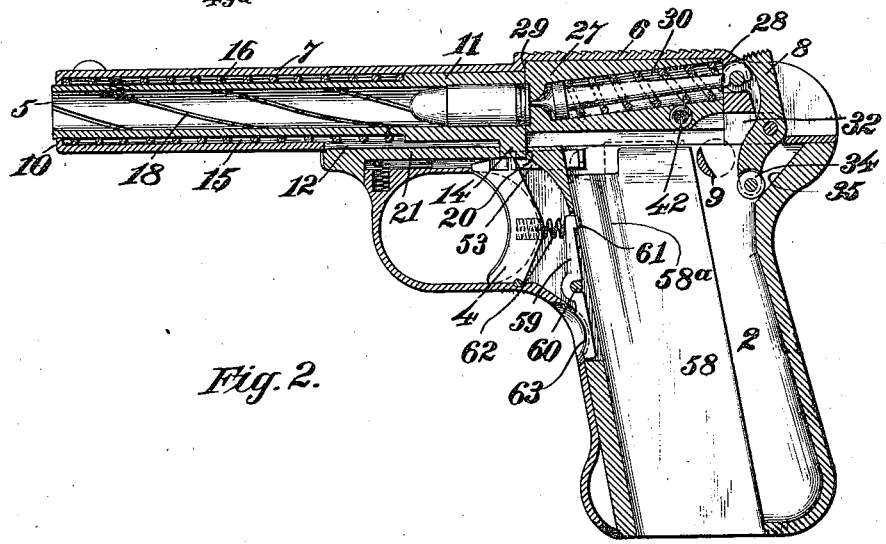
Witnesses:
Inventor
Elbert H Searle
By
Knight Bros
Attorneys

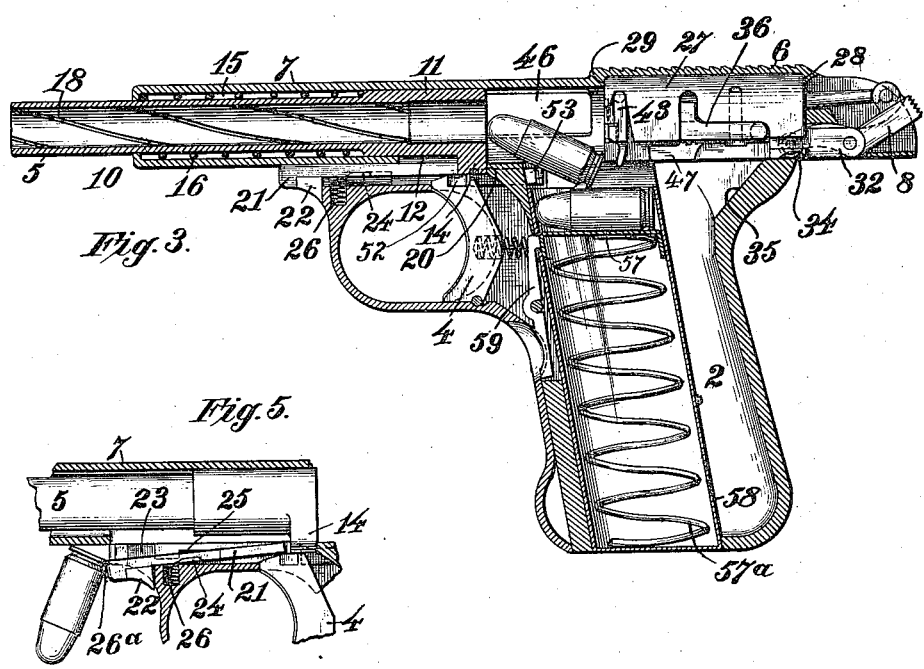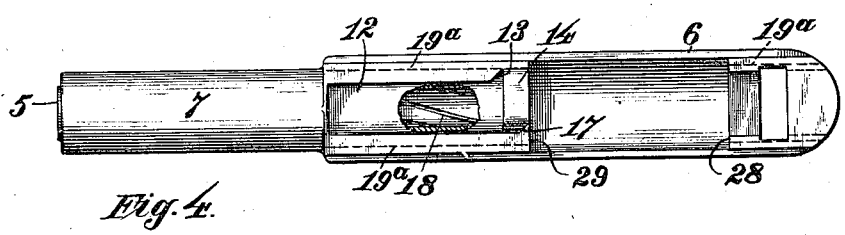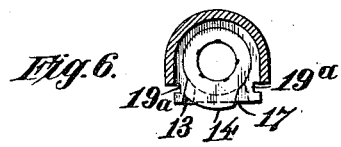

No. 804,985. PATENTED NOV. 21, 1905.
E. H. SEARLE.
FIREARM.
APPLICATION FILED OCT. 1, 1904.
4 SHEETS—SHEET 3.
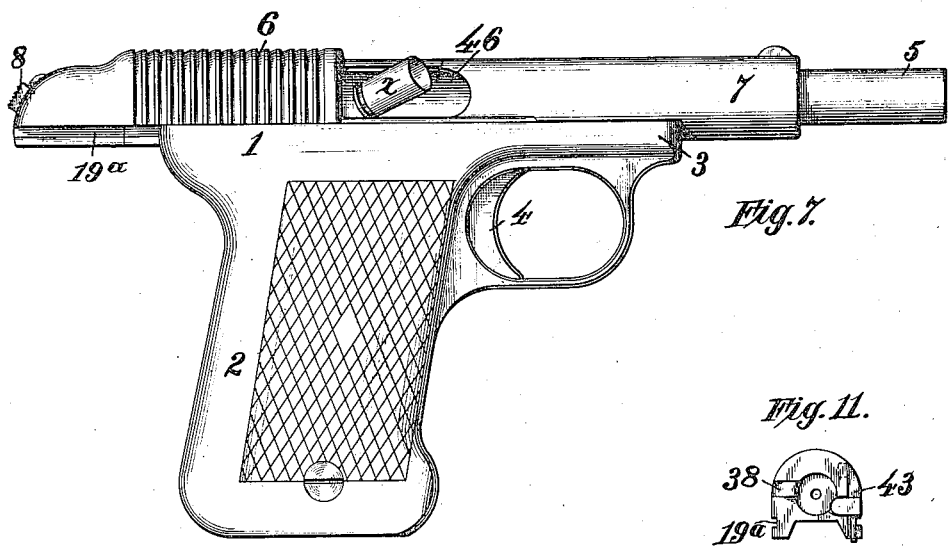
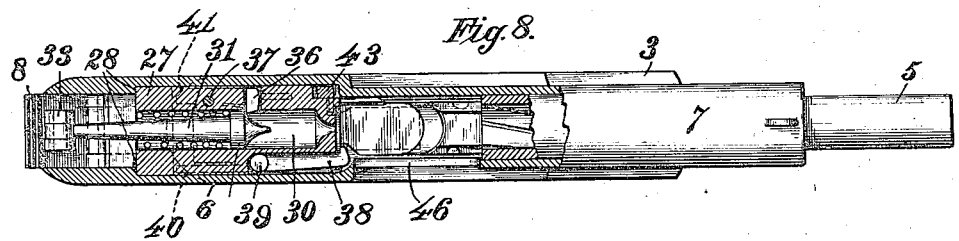
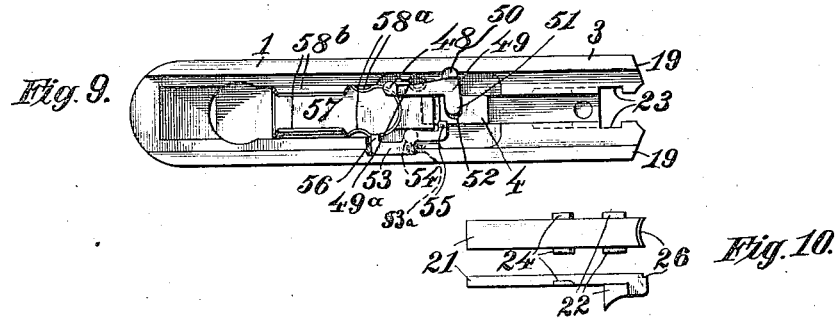
Witnesses:
Inventor
Elbert H. Searle
By
Knight Bros
Attorneys.

No. 804,985. PATENTED NOV. 21, 1905.
E. H. SEARLE.
FIREARM.
APPLICATION FILED OCT. 1, 1904.
4 SHEETS—SHEET 4.
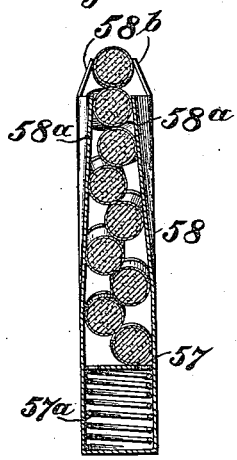
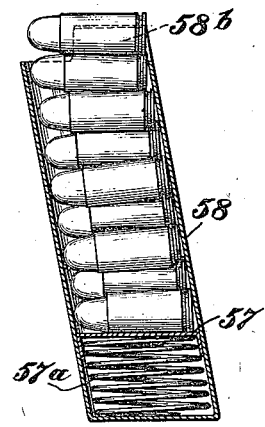
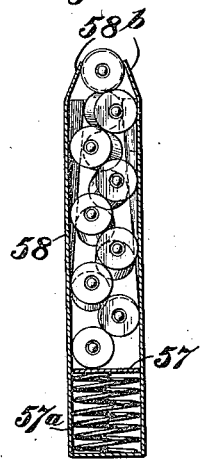
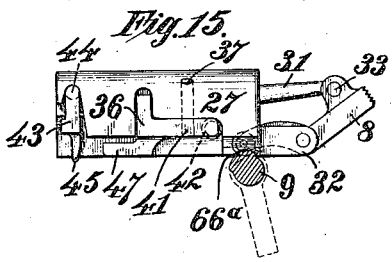
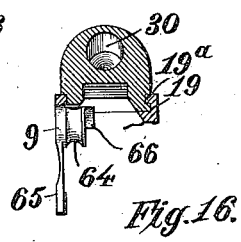
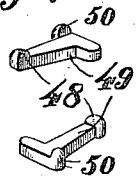
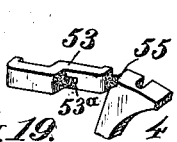
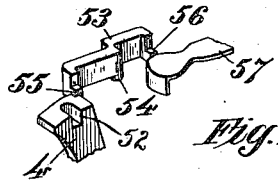
Witnesses:
Inventor
Elbert H. Searle
By
Attorneys

UNITED STATES PATENT OFFICE.

ELBERT H. SEARLE, OF PHILADELPHIA, PENNSYLVANIA, ASSIGNOR OF THREE-FOURTHS TO WILLIAM D. CONDIT, OF DES MOINES, IOWA.

FIREARM.

No. 804,985.   Specification of Letters Patent.   Patented Nov. 21, 1905.

Application filed October 1, 1904. Serial No. 226,835.

*To all whom it may concern:*

Be it known that I, ELBERT H. SEARLE, a citizen of the United States, and a resident of Philadelphia, in the State of Pennsylvania, have invented a certain new and useful Firearm, of which the following is a specification.

My invention relates to that type of firearms in which the extracting of the spent shell, the introduction of the fresh cartridge, and cocking of the gun are accomplished automatically through the recoil of the gun, and particularly to those guns of this type in which the recoiling part forms the breech-closure and sustains the rearward pressure of the powder-gases in firing. For the sake of simplicity in construction guns of this class have been made without any locking means for preventing the opening of the breech and have depended mainly upon the weight and inertia of the breech-closure to withstand the rearward pressure of the powder-gases; but this construction is dangerous, particularly if a powder charge is used larger than that for which the gun was originally intended, as the breech is liable to open prematurely.

One object of my present invention is to provide a simple and effective positive locking means to prevent recoil of the breech-closure until after the projectile leaves the barrel, which locking means is prevented from unlocking by the passage of the projectile through the barrel, thereby preventing the premature opening of the breech. This feature of my invention is dependent upon the discovery that the inertia of the projectile or its resistance to rotation as it takes into the rifling of the barrel amounts to a very considerable force that can be utilized to perform work without materially detracting from the effect of the rifling on the projectile.

Another feature of my invention therein consists, broadly, in the utilization of this inertia or resistance to turning in the projectile for the purpose of actuating a working part in an automatic firearm.

Other objects of my invention are to provide suitable means whereby the above-mentioned object may be carried out and whereby other operating parts of the gun are greatly simplified in construction and rendered more durable in use.

For purposes of illustration I have shown my invention as applied to a pistol; but it will be understood that its various features of construction are applicable to other classes of guns, and I therefore do not limit myself to the particular application illustrated.

In the accompanying drawings, Figure 1 is a side elevation of a piston embodying my invention. Fig. 2 is a vertical longitudinal section of the same in the plane of the axis of the barrel and the center of the grip, the parts being in position occupied immediately after firing. Fig. 3 is a view similar to Fig. 2 with the parts in their positions which they occupy after recoil and in the act of introducing the new cartridge. Fig. 4 is a bottom view of the receiver, together with the barrel which is secured therein, the barrel being broken away to disclose the rifling within it. Fig. 5 is a detail view showing a portion of the frame, the receiver, and the barrel, together with the frame-lock by which the barrel is held against longitudinal movement on the frame, and consequently limits the reciprocating movement of the receiver. The view also suggests the release of the frame-lock by utilizing the flange of the cartridge. Fig. 6 is a transverse section through the receiver immediately in rear of the breech of the barrel, showing the limits of the rotary motion of the barrel in the receiver and the shoulder on the receiver, which the barrel overlaps to prevent recoil until the proper time. Fig. 7 is an elevation of the side of the pistol opposite to that shown in Fig. 1 and with the parts in positions intermediate of those shown in Figs. 2 and 3—namely, when the receiver has completed its rearward movement and the spent shell is in the act of leaving the gun. Fig. 8 is a top plan view of the pistol with some of the parts in horizontal section to disclose the firing and extracting mechanism. Fig. 9 is a plan view of the frame, showing the track in which the receiver reciprocates, the sear-rocker with its connection with the trigger, and the trigger-lock, operating when the last cartridge is introduced into the chamber, to prevent firing the gun until a newly-charged cartridge-magazine is introduced. Fig. 10 shows by plan and side views the construction of the frame-lock. Fig. 11 is a front view of the breech-block, showing the extractor and ejector mounted thereon, such breech-block being constructed for insertion into the receiver, but to be held immovable in relation thereto when in use. Figs. 12, 13, and 14 show the magazine in sectional front, side, and rear elevations, respectively. Fig. 15 is a side view of the breech-block, together with the cocking-lever, sear, and ejector mounted thereon, and the safety device carried by the frame in operative relation to the cocking-lever. Fig. 16 is a vertical section through the breech-block and a portion of the frame in the plane of the safety-catch. Fig. 17 illustrates by two perspective views the construction of the sear-rocker. Figs. 18 and 19 are detail perspective views of the trigger-lock and its relation to the trigger and to the follower. Figs. 20 and 21 are detail views showing the relation of the sear-rocker to the trigger and the sear.

The illustrative embodiment of my invention herein shown comprises a frame 1, having a grip 2, within which is contained a suitable magazine, and a forward extension 3, carrying a frame-lock, by which the parts are retained in assembled relation, a trigger 4, a barrel 5, a receiver 6, mounted to reciprocate longitudinally upon the frame 1 and having a forward extension 7, which surrounds and fits the barrel 5 and containing within it a breech-block, which carries the striker, sear, extractor, and ejector, a cocking-lever 8, and a safety-catch 9.

*Mounting the receiver and barrel.*—For this purpose the barrel 5 fits the forward extension 7 of the receiver 6 through the medium of a forward reduction 10 in the bore of the receiver extension and a rear enlargement 11 on the barrel. The barrel is thus connected with the receiver in a manner to permit the receiver to reciprocate longitudinally relatively to the barrel for a distance determined by the length of a slot 12 in the under side of the receiver, Figs. 2, 3, and 4, while the barrel can rotate relatively to the receiver to an extent permitted by the lateral offset of the slot 12, which is shown in Figs. 4 and 6. This lateral offset of the slot provides a shoulder 13 to engage a lug 14, projecting downwardly from the barrel, which will prevent rearward movement of the receiver until the lug 14 is displaced in a rotary direction from front of said shoulder. In the space 15 between the enlargement 11 and reduction 10 is located a spring 16, which tends to press the receiver forward relatively to the barrel and returns the parts to normal positions after recoil takes place. The shoulder 13 is inclined, as shown in Fig. 4, and a shoulder 17 is provided in rear of the lug 14, so that as the receiver moves rearward the lug 14 will be displaced in a rotary direction by the shoulder 13, and when the receiver is returned to forward position under the action of spring 16 the shoulder 17 will rotate lug 14 into position in rear of shoulder 13; but the barrel 5 is provided with rifling 18 in such direction that the inertia of the projectile or its resistance to being turned by said rifling will tend to rotate the barrel in a direction to hold lug 14 back of shoulder 13, and it thus becomes impossible for the receiver to recoil so long as the rifling of the barrel is inducing a turning movement in the projectile. The angle of the shoulder 13 is so selected that rearward pressure of said shoulder against the lug 14, which is proportional to the rearward pressure of the powder-gases against the cartridge when fired, is insufficient to overcome the resistance of said lug 14 against turning which results from the projectile taking into the rifling. Thus it will be seen there is provided a positive lock for the breech-bolt, making it impossible for the breech to open until after the projectile has left the barrel, at which time the lock is released and the opening takes place under the action of recoil, as distinguished from the pressure of the powder-gases between the projectile and the cartridge-shell. The receiver is connected with the frame by an undercut track 19 on the frame and corresponding tongues and grooves 19ª on the receiver, the receiver being slid rearward over the forward extension 3 of the frame until the lug 14 on the barrel reaches the abutment 20 on the frame, after which the frame-lock 21 is introduced in front of lug 14, and the parts are then prevented from moving forward beyond the position shown in Fig. 2. Frame-lock 21 is held in position in front of lug 14 by means of forward lugs 22, which enter through the bottom of vertical recesses 23 in the frame, and rear lugs 24, which enter the forward ends of horizontally-elongated recesses 25 in said frame, (see Figs. 5, 9, and 10,) said frame-lock being held upward in engaging position by a spring 26, but being readily depressed by engaging the lock, as at 26ª, either with the thumb-nail or by the head of a cartridge.

The breech-block is shown at 27 and fits immovably in the receiver between shoulders 28 29, Figs. 2, 3, 4, and 8. This breech-block has an inclined bore 30, in which is located the spring-pressed striker 31, and also has rearwardly-extending ears 32, in which is fulcrumed the cocking-lever 8, connected to the striker at 33 and having an operating end 34, which rides from the inclined surface 35 as the receiver recoils in order to cock the gun. The breech-block 27 also carries the sear 36, fulcrumed at 37, and the extractor 38, fulcrumed at 39, while said sear and extractor have rearwardly-extending tailpieces 41 40, between which is located a spring 42, Figs. 2, 8, and 15, which presses both of said parts into operative position. The breech-block is further provided with an ejector 43, pivoted at 44 and having a tailpiece 45, that encounters a fixed part of the frame when the receiver recoils and throws the cartridge-shell x out of the discharge-opening 46, Figs. 3 and 7. To release the sear from the striker 31, said sear is provided with a tailpiece 47, projecting forwardly in front of the boss 48 of the sear-rocker 49, Figs. 9 and 17, which sear-rocker is pivoted at 50 and has a horn 51 entering a recess 52 in a trigger 4. The sear-rocker is movable vertically on its pivot and is held against such movement by a spring 49ª, Figs. 9 and 20.

The trigger-lock, operating to prevent pulling the trigger and exploding the last cartridge, is shown at 53, being pivoted at 54 and provided with an end 55, that enters behind the trigger 4 when its rear end 56 is engaged by the follower 57 of the magazine 58, this taking place after the last cartridge leaves the magazine and enters the chamber of the gun. When the magazine is filled or removed, the follower is out of engagement with the trigger-lock, and the trigger-lock is moved in the other direction by a spring 53ª, interposed between the frame and the trigger-lock.

The magazine 58 is inserted upwardly through the grip or handle of the gun and retained in place by a detent 59, pivoted at 60, engaging the magazine-case at 61 and held into such engagement by a spring 62, which also serves to press the trigger 4 outward.

The lower end of the detent 59 is exposed at 63 in convenient position to be pressed in by the finger to release the magazine-case when empty.

The magazine-case is constructed in a manner to receive a double row of cartridges at its lower end and to gradually shift these two rows into a single row as they progress upward and to discharge one at a time in a central position at the upper end of the case. To accomplish this purpose, the sides of the cartridge-case are pressed inward to form ribs 58ª of gradually-increasing depth and with centering-lips 58ᵇ at top, which arrest the uppermost cartridge in central position and in front of the breech-block 27 as the latter returns to close the breech, as will be understood upon reference to Figs. 2, 12, 13, and 14. 57ª represents the feeding-spring for the follower 57.

The safety-catch 9 has a groove 64, by which it fits in a bearing in the wall of the frame 1 and carries on the outside of the frame a controlling-lever 65, while within the frame it has a segmental extension 66, which when the lever 65 is thrown up stands out of the path of the operating end 34 of the cocking-lever 8, but when lever 65 is thrown down into the position shown in Figs. 15 and 16 will stand across the path of the operating end of said cocking-lever in a manner to secure the striker in cocked position and prevent its being driven forward, even though the trigger be pulled. This catch also has a boss 66ª, which engages a correspondingly-formed recess in the rear end of the breech-block to prevent opening the breech when the safety-catch is set. Said boss may also be turned to engage in front of the breech-block to hold it open for cleaning the gun.

The operation of the gun is as follows: The magazine, filled with cartridges, is inserted in the grip or handle of the gun, and the receiver is withdrawn by hand and allowed to close again under the action of spring 16. As the receiver is drawn back the lower end of cocking-lever 8 drags over the inclined surface 35 and rocks the lever on its pivot sufficient to draw the head of the striker past the sear 36. The striker thus remains cocked when the receiver returns to close the breech. If the pistol is not fired immediately, the safety-catch 9 may be thrown into position to intercept the operating end 34 of the lever 8, and the gun is thus prevented from being discharged. When it is desired to fire the gun, the safety-catch 9 is moved into the position shown in Fig. 1, when the striker may be released by pulling the trigger, which moves the sear-rocker 49 on its pivot 50, so that its rear end presses outward on the tailpiece 47 and withdraws the sear from the head of the striker. The cartridge is thus fired, the advancing projectile takes into the rifling of the barrel, and by its resistance or inertia holds the lug 14 to the left behind the shoulder 13, and it is impossible for the breech to open under the back pressure of the powder-gases so long as the projectile thus holds the barrel to the left; but as soon as the projectile has left the barrel and the reaction or recoil effect sets in the receiver displaces the lug 14 to the right in consequence of the bevel of the shoulder 13, as seen in Fig. 4, and the receiver moves backward, compressing spring 16, exposing the discharge-opening 46, drawing the spent shell $x$ out of the chamber, causing the ejector 43 to throw out the shell, cocking the striker 31, withdrawing the tail 47 of the sear 36 from the sear-rocker 49, so that the sear can move in front of the striker-head, and permitting a new cartridge to move up in front of the breech-block, after which the receiver is returned under the action of spring 16, the new cartridge is shoved in the chamber, the lug 14 is moved to the left by the forwardly-presented inclined shoulder 17, Figs. 4 and 6, and the sear-tail 47 moves up into position, overlapping the end of the sear-rocker, all of these movements taking place, however, before the trigger is naturally released. When the trigger is released, the rear end 48 of the sear-rocker is moved inward and rides under the sear-tail 47, there being sufficient vertical yielding in the parts to permit this to take place. The trigger may then be pulled again and repeatedly until all the cartridges have been successively introduced into the chamber, when the follower 57 will engage the trigger-lock 53 and lock it into position behind the trigger to prevent the trigger being pulled. It is then practicable to fire the gun only by withdrawing the magazine-case or by inserting a new case with cartridges in it.

By using the automatic locking member I am enabled to construct the receiver and its breech-block of lighter dimensions than when it is necessary to depend upon the inertia of these parts to withstand the back pressure of powder-gases or to construct the gun as a whole with much less complication than when it is necessary to have a positive locking means engaging the breech-block and displaced by recoil.

Having thus described my invention, what I claim is—

1. In an automatic firearm, mechanism actuated by the recoil after the projectile leaves the bore, and locking means preventing said mechanism from recoiling and holding the same positively locked, by the passage of the projectile through the barrel and released to permit the recoil after the projectile leaves the said barrel.

2. In an automatic firearm, mechanism actuated automatically on the firing of the arm, and a locking device preventing actuation of such mechanism held positively locked by the passage of the projectile through the barrel and released to permit the actuation of the mechanism after the projectile leaves the said barrel.

3. In an automatic firearm having its breech opened by the recoil, means for locking the breech against opening, and a barrel controlling said locking means, positively held against movement by the passage of the projectile therethrough to hold the breech closed, and permitted to move to open the breech after the projectile leaves the barrel.

4. In a firearm, a part to be operated and a barrel having movement in a rotary direction, controlling the operation of said part; said barrel having rifling and held positively against rotation by the inertia of the projectile as the projectile takes into the rifling, to prevent the operation of said part, and rotated after the projectile leaves the barrel, to permit the operation of said part.

5. In an automatic firearm, a movable breech-bolt opening by the act of firing, and a locking means controlling the movement of said bolt, and a barrel having a rotary motion, provided with means for controlling said locking means, and with rifling, and held against unlocking said locking means, during the passage of said projectile, by the inertia of the projectile as it takes into the rifling.

6. In an automatic firearm, a barrel fixed against longitudinal movement and having a movement in a rotary direction, a breech-bolt opening by the act of firing, a locking means, unlocking and locking by rotary movement of the barrel, means tending to rotate the barrel in the direction of unlocking, and rifling in the barrel, formed in a direction which causes the inertia of the projectile to tend to rotate the barrel in the direction of locking as the projectile passes through the barrel.

7. In an automatic firearm, the combination of a frame, a barrel fixed against recoil on the frame having motion in a rotary direction, relatively thereto, a movable breech-closure opening and closing the breech of the barrel, having a forward extension in which the barrel has turning bearing, and means whereby the barrel interlocks with the breech-closure and prevents the movement of the same by its rotary motion in one direction; said barrel being provided with rifling in a direction to cause the barrel to interlock by the inertia of the projectile as rotary motion is induced in the projectile by the rifling.

8. In an automatic firearm, the combination of a frame, a receiver mounted to slide upon the frame and having a forward extension, a barrel mounted to rotate in the forward extension of the receiver, and to permit longitudinal movement of the receiver relatively thereto; said barrel having means whereby it interlocks with the receiver by its rotary movement and means whereby the projectile holds the receiver locked during the passage of the projectile through the barrel.

9. In an automatic firearm, the combination of a frame, a receiver mounted to slide upon the frame and having a forward extension, a barrel mounted to rotate in the forward extension of the receiver, and to permit longitudinal movement of the receiver relatively thereto, and a spring between the barrel and said forward extension returning the receiver to closed position; said barrel having means whereby it interlocks with the receiver by its rotary movement and means whereby the projectile holds the receiver locked during the passage of the projectile through the barrel.

10. In an automatic firearm, the reciprocating member which closes the breech, the barrel having a rotary movement; said barrel being provided with a lug and said reciprocating member having a shouldered recess into engagement with which the lug moves, to limit the rotation of the barrel and interlock it with the receiver.

11. In an automatic firearm, the reciprocating member which closes the breech, the barrel having a rotary movement, and carrying a lug; said reciprocating member formed with a shoulder with which the lug on the barrel interlocks to prevent opening of the breech until recoil takes place, and having an additional shoulder which engages the lug on return of the reciprocating member to force the barrel and breech-bolt into interlocked relation.

12. In a firearm, the combination of the receiver provided with shoulders formed thereon having a reciprocating movement to open and close the breech and the breech-block removably mounted in said receiver between said shoulders and carrying firing-mechanism.

13. In combination with the barrel, the breech-block reciprocating to and from the barrel to open and close the breech; a striker mounted in the breech-block and a cocking-lever connected at its upper end to the rear end of the striker, pivoted intermediate its ends below the striker and having its lower end engaging the frame of the firearm to cause cocking of the striker as the breech-block moves.

14. In a firearm, the combination with the frame, of the barrel mounted on the frame, the breech-block movable to and from the barrel to open and close the breech, the striker carried by the breech-block, the pivoted cocking-lever connected with the striker, moving rearward with the breech-block and engaging the frame to cock the striker, and a safety-catch located on the frame in position to engage the cocking-lever when the breech is closed and movable into and out of the path of the cocking-lever.

15. In a firearm the combination with the barrel of the breech-block reciprocating to open and close the barrel, a striker mounted in the breech-block, the sear for holding the striker in cocked position, the extractor mounted on the breech-block, and a spring common to both the extractor and sear.

16. In a firearm, the combination of the breech-bolt and the sear mounted thereon, a sear-rocker mounted on a part to which the breech-bolt has relative movement and the trigger with which the sear-rocker is connected; said sear-rocker having a movement in addition to the movement imparted to it by the trigger, whereby it moves into engagement with the sear after the return of the breech-bolt and when the trigger is released and a spring acting on said sear-rocker to normally prevent this additional movement.

17. In a firearm the combination of the trigger, the trigger-lock pivoted intermediate its ends on the frame and movable at one end into engagement with the trigger to prevent the movement of the trigger, and a magazine having a follower independent of but adapted to engage the other end and move the trigger-lock into engagement with the trigger.

18. In a firearm, the combination of the frame, the barrel and the receiver fitted onto the frame by a longitudinal track, the receiver being movable relatively to the barrel, and the frame-lock engaging the barrel and the frame, to prevent removal of the barrel and to permit the movement of the receiver.

19. The combination with the frame, of the barrel and the breech-bolt fitted on the frame by a longitudinal track, means for rotating the barrel relatively to the bolt means for moving the bolt longitudinally and relatively to the barrel, and a lock to hold the barrel and the breech-bolt on the frame engaging the barrel and permitting its rotation.

20. In a firearm, the combination of the frame, the barrel and the receiver fitted onto the frame by a longitudinal track, the receiver being movable relatively to the barrel, and the frame-lock engaging the barrel to prevent its removal and to permit the movement of the receiver and having lateral lugs entering recesses in the frame but movable from said recesses by a transverse movement of the frame-lock substantially in the manner described.

21. In a firearm, the combination with the magazine constructed to receive a double row of cartridges at its lower end, of vertical ribs of gradually-increasing depth formed within said magazine near the forward end and centering-lips at the top of the magazine in the rear of said ribs.

22. In a firearm, the combination with the magazine constructed to receive a double row of cartridges at its lower end, a forward portion of each side of the magazine being deflected inwardly relatively to the rear portion to gradually restrict the area of the path in which the cartridges move.

23. In combination with the magazine-firearm having a trigger in front of the magazine; a trigger-lock pivoted at an intermediate point and having one end projecting into locking relation with the trigger and its other end projecting into position to be engaged by a part moving in the magazine and independent of the trigger-lock, and a spring for holding the trigger-lock normally out of engagement with the trigger.

24. In a gun, the combination with a magazine-follower and a trigger, of a trigger-lock moving to lock and unlock the trigger and moved to one position by the follower, and a spring moving it to the other position.

25. In a gun, the combination with a trigger and a magazine-follower, of an independently-mounted trigger-lock moved by the follower into locking position.

26. In a gun, the combination with a trigger and a magazine-follower, of an independently-mounted trigger-lock moved by the follower into locking position and a spring moving it in the other direction.

27. In a firearm, the combination with the barrel and the breech-bolt reciprocating to and from the barrel to open and close the breech, of a firing-pin carried by the breech-bolt, and a cocking-lever pivoted to the breech-bolt connected with the firing-pin and provided with means for manually cocking it and means for engaging the frame of the firearm to automatically cock the firing-pin when the breech-bolt reciprocates.

The foregoing specification signed this 15th day of September, 1904.

ELBERT H. SEARLE.

In presence of—
 FRANCIS S. LAWS,
 S. C. CHATHAM.